(12) United States Patent
Heren (10) Patent No.: US 8,627,657 B2
(45) Date of Patent: Jan. 14, 2014

(54) VEHICLE HYDROSTATIC TRANSMISSION DEVICE

(75) Inventor: Jean Heren, Margny lès Compiègne (FR)

(73) Assignee: Poclain Hydraulics Industrie, Verberie (FR)

( * ) Notice: Subject to any disclaimer, the term of this patent is extended or adjusted under 35 U.S.C. 154(b) by 1086 days.

(21) Appl. No.: 12/445,838

(22) PCT Filed: Oct. 16, 2007

(86) PCT No.: PCT/FR2007/052163
§ 371 (c)(1),
(2), (4) Date: Jun. 23, 2009

(87) PCT Pub. No.: WO2008/050039
PCT Pub. Date: May 2, 2008

(65) Prior Publication Data
US 2010/0205954 A1    Aug. 19, 2010

(30) Foreign Application Priority Data
Oct. 18, 2006  (FR) ...................................... 06 54337

(51) Int. Cl.
*F16D 31/02* (2006.01)
*B60K 17/356* (2006.01)

(52) U.S. Cl.
USPC .............................. 60/424; 180/242; 180/308

(58) Field of Classification Search
USPC .............................. 60/424, 484; 180/242, 308
See application file for complete search history.

(56) References Cited

U.S. PATENT DOCUMENTS 6,749,037 B2 *   6/2004  Lindholdt .................... 180/242

FOREIGN PATENT DOCUMENTS

| EP | 0547947 B1 | 4/1995 |
| EP | 0816153 A2 | 1/1998 |
| EP | 1004469 A2 | 5/2000 |
| EP | 1026024 A1 | 8/2000 |
| EP | 1026025 A1 | 8/2000 |
| EP | 1010566 B1 | 4/2003 |
| FR | 2719001 | 7/1996 |
| FR | 2828544 A1 | 2/2003 |

* cited by examiner

*Primary Examiner* — F. Daniel Lopez
(74) *Attorney, Agent, or Firm* — Ladas & Parry LLP (57) ABSTRACT

A hydrostatic transmission apparatus having a main pump, two main ducts that are respectively a feed main duct and a discharge main duct for first and second hydraulic motors serving to drive two drive members of a vehicle that are situated one after the other. At least the first hydraulic motor is a dual motor made up of two elementary motors, a first one of which is connected via a series link to the second hydraulic motor. A link selector can take up a first position in which a series loop including said series link coexists with a direct loop for directly linking at least the second elementary motor to the two respective orifices of the main pump, and a second position in which at least one of said direct and series loops is bypassed by a bypass link having a constriction valve.

23 Claims, 4 Drawing Sheets

VEHICLE HYDROSTATIC TRANSMISSION DEVICE

BACKGROUND OF THE INVENTION

The present invention relates to hydrostatic transmission apparatus for a vehicle having at least two drive members disposed one after the other in the direction of travel of said vehicle, the apparatus comprising a main hydraulic pump having two orifices, two main ducts that are respectively a feed main duct and a discharge main duct, first and second hydraulic motors connected to the main pump for the purpose of driving respective ones of said first and second drive members, and a link selector, at least the first hydraulic motor being a dual motor made up of two elementary motors, a series link existing between the first elementary motor of said first hydraulic motor and the second hydraulic motor, the link selector being suitable for taking up a first position in which a series loop including said series link coexists with a direct loop including a direct link linking at least the second elementary motor of the first hydraulic motor to the two respective orifices of the main pump, and a second position in which at least one of said direct and series loops is bypassed by a bypass link.

The vehicle can have two, three, four, or more wheels.

Apparatus of this type is known, for example, from EP 0 547 947, FR 2 719 001, EP 0 816 153, EP 1 010 566, EP 1 026 024, and EP 1 026 025.

The first position of the link selector is, in particular, useful when the vehicle is in a working situation. In such a situation, the series loop makes it possible to synchronize the relevant drive members, while the direct loop makes it possible to obtain the desired output torque. Thus, drive member spin is avoided, while also obtaining the desired output torque, thereby making it possible, in particular for the vehicle to travel over difficult terrain.

When the link selector is in the second position, the total cylinder capacity of the transmission is small, which makes it possible for the vehicle to travel at higher speed. Said second position is thus useful, in particular when the vehicle is traveling on a road for going quickly between two work zones.

Braking of such a vehicle can, at least in part, take place hydrostatically, by pressure being built up in that one of the main ducts that is serving as the discharge at the time.

Naturally, the effect of hydrostatic braking is limited to the group of cylinder capacities of the motors that have a pressure difference at their terminals, with increased pressure at the terminal that is connected to the duct serving as the discharge, and a different pressure at the terminal connected to the duct serving as the fluid feed.

However, when the link selector is in the second position, the bypass link puts certain terminals of motors or of groups of motors at the same pressure, so as to deactivate them. Under such conditions, the hydrostatic braking does not affect the deactivated motor(s). As a result, the retaining torque useful for the braking is merely the retaining torque that is developed by the non-deactivated motor(s). Therefore, the effectiveness of the hydrostatic braking is limited.

An object of the invention is to remedy the above-mentioned drawbacks by proposing hydrostatic transmission apparatus making improved hydrostatic braking possible even when one of the loops constituted by the direct loop and by the series loop is bypassed.

This object is achieved by the fact that the apparatus of the invention further comprises constriction means suitable for being activated to restrict the flow of fluid through said bypass link.

Thus, during hydrostatic braking that is performed while the link selector is in its second position, even the group(s) of cylinder capacities of the motor(s) that is/are deactivated participate(s) in the hydrostatic braking because the constriction in the bypass link puts the terminals of said groups of cylinder capacities at different pressures. In other words, the retaining torque is not only the retaining torque that is developed by the active groups of cylinder capacities, but rather it is also the retaining torque that is obtained by the constriction of the bypass link.

The effectiveness of the hydrostatic braking is thus increased due to the restriction in the flow of fluid through the bypass link.

Advantageously, the constriction means comprise a bypass selector suitable for enabling fluid to flow substantially freely in said bypass link when the fluid pressure in said link is less than a pressure threshold in said link, and for restricting the flow of fluid in said link when said pressure is greater than said pressure threshold.

When in its first position, the bypass selector can thus make it possible for the transmission to operate normally at high speed, while at least one of the direct or the series loops is bypassed, while said bypass selector can be moved to constrict the bypass link when hydrostatic braking is necessary at a level such that the fluid pressure in the bypass link exceeds the pressure threshold.

It should be noted that the bypass link is preferably connected to one of the main ducts and, more precisely, to that one of the main ducts that, when the vehicle is in the preferred direction of travel, is the discharge main duct. In which case, when hydrostatic braking is caused, the pressure in said main duct increases, and causes the pressure in the bypass link to increase, thereby causing the bypass selector to move to restrict the flow through the bypass link when the pressure in said bypass link is greater than the pressure threshold. By choosing the discharge duct to be said duct to which the bypass link is connected, it is possible, when the link selector is in the second position, to prevent the bypassed motor(s) from causing any significant resistive torque to be opposed to the drive torque.

The pressure threshold to which reference is made above can be defined as a function of the additional hydrostatic braking torque necessary on the transmission of the vehicle. Advantageously, said threshold is at least equal to the boost pressure of the hydraulic circuit. For example, it is approximately in the range 10% to 20% of the maximum pressure of the circuit (which is, in general, defined by the pressure ratings of pressure limiters connected to the main ducts).

Advantageously, the apparatus further comprises a check valve that is disposed in parallel with the bypass selector so as to allow free flow in the bypass link, in a single flow direction only.

This possibility is particularly useful when it is desired, in certain operating situations, to sustain a high fluid flow rate in the bypass link, without causing the selector to go into its position in which it restricts the flow through said link.

In particular, as indicated above, the bypass link is preferably connected to that one of the main ducts that serves as the fluid discharge when the vehicle is in the preferred travel direction (forward travel). In certain situations, it can be necessary to reverse at relatively high speed, while the link selector is in its second position and while having relatively large fluid flow-rate requirements. The above-mentioned check valve is then advantageous because, in the direction of travel corresponding to reverse, in which direction the main duct is to which the bypass link is connected serves as the feed, said check valve makes it possible to allow the required flow-rate to pass through, at the feed pressure, without constricting the bypass link.

Advantageously, the bypass selector is a pressure-reducing valve.

Such a valve constitutes simple means for constricting the bypass link in a manner such as to facilitate hydrostatic braking. A pressure-reducing valve placed at one of the terminals of the groups of cylinder capacities inactivated by the link sector being in the second position makes it possible to reduce the pressure at said terminal, thereby generating the pressure difference necessary for said group of cylinder capacities to participate in the hydrostatic braking force.

Advantageously, the apparatus further comprises control means for controlling the bypass selector, which control means are suitable for controlling said selector as a function of the stroke of a control member.

This makes it possible to adjust, in the desired manner, the level of restriction of the flow of fluid through the bypass link.

Advantageously, the constriction of the bypass link is progressive, depending on the position of the bypass selector.

This progressiveness makes it possible, when the link selector is in the second position, to adapt the participation of the deactivated motors in the hydrostatic braking, as a function of the braking needs.

Advantageously, each of the two elementary motors of the first hydraulic motor has first and second elementary connections, while the second hydraulic motor has at least first and second main connections. When the link selector is in the first position, said first elementary connections are then connected to the first main duct, the second elementary connection of the first elementary motor is connected to the second main connection of the second hydraulic motor, while the second elementary connection of the second elementary motor and the first main connection of the second hydraulic motor are connected to the second main duct. When the link selector is in the second position, said first elementary connections are connected to the first main duct and the second elementary connection of the first elementary motor is connected to the second main connection of the second hydraulic motor, while the second elementary connection of the second elementary motor or the first main connection of the second hydraulic motor is connected to the first main duct, via the bypass link.

This makes it possible, in simple manner, to implement the above-mentioned direct loop and series loop.

Advantageously, the first elementary connections are united to form a common first main connection, while the second elementary connections are separate and form respective ones of the second and third main connections.

In this configuration, the motor having said three main connections is particularly compact, and the fact that the two elementary connections are grouped together makes it possible to simplify the circuit.

Under certain circumstances, it is possible to choose that only one of the motors is made up of two elementary motors. Under other circumstances, it is desirable for each of the two motors that serve to drive respective ones of the two drive members situated one after the other to be made up of two elementary motors.

BRIEF DESCRIPTION OF THE DRAWING FIGURES

The invention can be well understood and its advantages appear more clearly on reading the following detailed description of an embodiment shown by way of non-limiting example. The description refers to the accompanying drawings, in which.

DETAILED DESCRIPTION OF THE PREFERRED EMBODIMENTS

Figure 1:
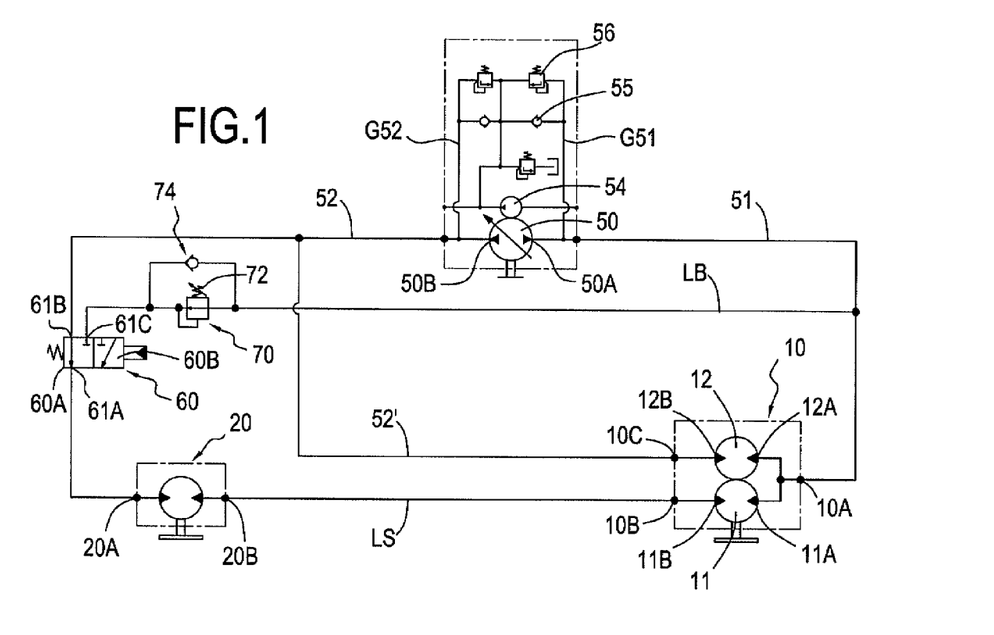
FIG. 1 shows the hydraulic circuit of hydrostatic transmission apparatus of the invention, with the link selector in its first position.

The vehicle driven by the apparatus whose hydraulic circuit is shown in FIG. 1 comprises two drive axles that are situated one behind the other in the direction of travel. Each of the axles is provided with one or more drive members. The drive member(s) on the first axle is/are coupled to a first hydraulic motor 10, and the drive member(s) on the second axle is/are coupled to a second hydraulic motor 20. The motor 10 is a dual motor, and is made up of two elementary motors 11, 12. Conversely, in FIGS. 1 and 2, the second motor 20 is a singe motor.

The circuit includes a main hydraulic pump 50 having two orifices, respectively 50A and 50B, and having a variable delivery rate.

The circuit also includes two main ducts, respectively a main duct 51 connected to the orifice 50A, and a main duct 52 connected to the orifice 50B.

In a manner known per se, the apparatus includes a boost circuit including a booster pump 54 that, via check valves 55, can feed fluid to the ducts 51 or 52 via ducts G51, and G52 so as to avoid cavitation in the motors. Two pressure limiters 56 protect the circuit against excessive pressure.

The circuit includes a link selector 60 that, in this example, is controlled hydraulically. Naturally, other means for controlling the link selector, e.g. electrical or mechanical means, could be provided.

It can be seen that each of the elementary motors 11, 12 of the motor 10 has two elementary connections, respectively 11A & 11B, and 12A & 12B. It can also be seen that, with the motor 10 lying within the block B indicated in dashed lines, the first elementary connections 11A & 12A are united to form a common first main connection 10A for the motor 10, whereas the second elementary connections are separate and they form respective ones of the second and third main connections 10B and 10C.

As indicated above, the second motor 20 is a single motor and thus merely has two main connections, respectively 20A and 20B. Naturally, this does not rule out the possibility of the second motor 20 being a motor having a plurality of active operating cylinder capacities, but switching between those capacities is then controlled internally to the motor. The above-mentioned connections constitute the terminals of the motors.

The first elementary connections 11A, 12A of the motor 10 are connected continuously to the first main duct 51. The second elementary connection 11B of the first elementary motor 11 is connected to the second main connection 20B of the motor 20 and the second elementary connection 12B of the second elementary motor 12 is connected to the duct 52 via a link duct 52'.

In this example, the link selector 60 is of the type having three ports and two positions, its first port 61A being connected to the connection 20A, its second port 61B being connected to the duct 52, and its third port 61C being connected to the duct 51, via the bypass link LB that is described below. In its first position 60A shown in FIG. 1, the first and second ports of the selector are interconnected, so that the connection 20A of the motor 20 is connected to the main duct 52.

Thus, if it is considered that said second main duct is the main duct that serves as the fluid feed when the vehicle is traveling forwards, the second elementary motor 12 of the motor 10 and the motor 20 are fed in parallel because both of their respective connections 20A and 12B are connected to the duct 52. Conversely, the first elementary motor 11 of the motor 10 is fed in series with the motor 20 because its connection 11B is connected to the connection 20B via a series link LS.

Thus, when the selector 60 is in the first position 60A, the circuit includes firstly a direct loop that includes the direct link linking the elementary motor 12 of the motor 10 to the two orifices of the main pump 50, via the ducts 52' and 51, and secondly a series loop that includes the motor 20 whose connection 20A is connected to the duct 52, and the elementary motor 11 that is connected to the motor 20 via the series link LS.

Figure 2:
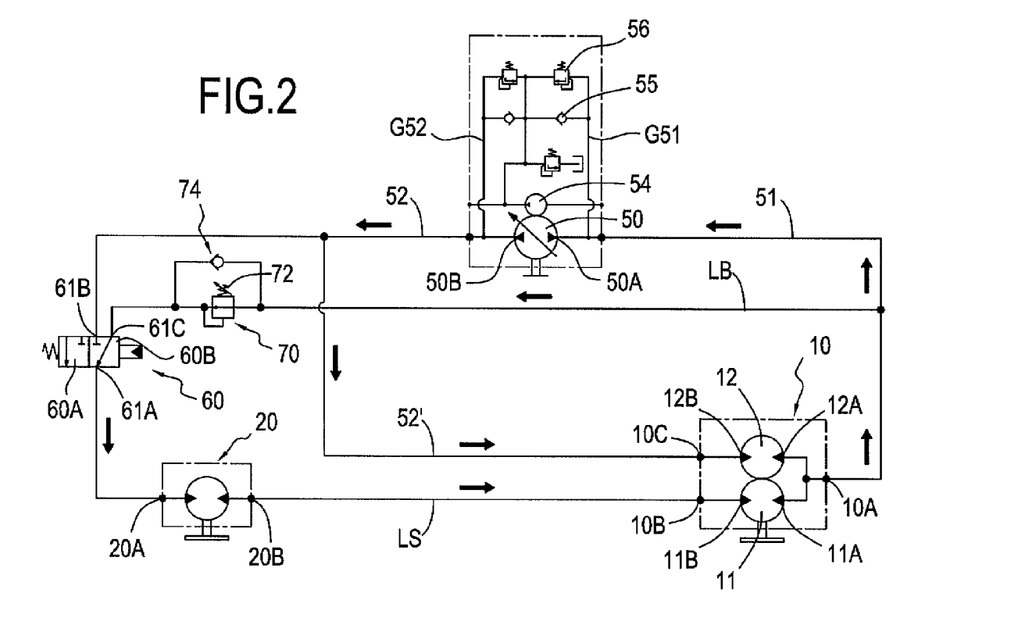
FIG. 2 shows the circuit of FIG. 1, with the link selector in its second position.

In FIG. 2, the selector 60 is in its second position 60B in which its first and third ports 61A and 61C are interconnected, so as to connect the connection 20A to the bypass link LB. It can be seen that, in this situation, the connection 20A of the motor 20 is no longer connected to the main duct 52, but rather it is connected to the main duct 51, via a bypass duct LB. Thus, in this situation, the series loop is bypassed because both of its terminals (connection 20A and end connection 11A) are connected to the same main duct, namely to duct 51 in this example.

The concept of "terminal" is used herein to make it easier to understand operation of the motors put in series in the series link relative to the pump. Two motors put in series have "internal" connections via which they are put in series, and terminals (external connections) that make it possible to connect the set comprising the two motors put in series to external ducts. In this example, the internal connections are the connections 20B and 10B that are interconnected via the series link LS, while the terminals are the connections 20A and 10A.

In this situation, when the link selector 60 is in its second position 60B, only the second elementary motor 12 of the motor 10 is active, insofar as only it generates drive torque for driving the vehicle. Conversely, the motor 20 and the first elementary motor 11 of the motor 10 are bypassed and are thus inactive. As indicated above, in the preferred operating direction, the duct 52 serves as the fluid feed, so that the motors that are bypassed are connected to the main duct 51 that serves as the discharge and thus do not result in a large amount of resistive torque being opposed to the drive of the vehicle.

In this situation, when hydrostatic braking is desired, the pressure is increased in the main duct 51 by reducing the cylinder capacity of the pump or by slowing down the drive of the pump 50. The elementary motor 12 then behaves as a pump and generates retaining torque that hydrostatically brakes the movement of the vehicle. Conversely, the motors 20 and 11 that are bypassed do not contribute to the hydrostatic braking since the pressure is the same at the connection 20A and at the connection 11A, those connections being the two terminals of the bypassed series loop. It should be emphasized that, even if the pressure in the series branch LS is different from the pressure at the terminals 20A and 11A, any braking force that is generated by the pressure difference between the connections 20B and 20A is compensated by the counter-force generated by the pressure difference between the connections 11B and 11A, which difference is of opposite sign so that the bypassed series loop does not deliver any retaining torque.

In order to improve the hydrostatic braking when the link selector 60 is in its second position 60B, the apparatus includes a bypass selector 70 that, in this example, is disposed in the bypass link LB.

In this example, said selector 70 is formed by a pressure-reducing valve or pressure reducer that, at rest, makes it possible for substantially free flow to take place through the bypass link LB whereas, when the pressure downstream from the reducer 70 exceeds the pressure rating of its return spring 72, said reducer 70 restricts the fluid flow through the bypass link LB.

The reducer 70 can be of a type known per se, with a moving element that, on moving, constricts the communication between its ports.

Thus, the bypass link LB is constricted progressively, depending on the position of the bypass selector or, more precisely, on the position of the moving element thereof.

Preferably, the spring 72 is of variable pressure rating.

It can be seen that a check valve 74 is disposed in parallel with the reducer 70 so as to allow free flow in the bypass link LB, in a single flow direction only. Said single direction is the direction going towards the orifice 50A of the pump 50.

It should be noted that, while the vehicle is traveling forwards, i.e. while the duct 52 is serving as the fluid feed, the fluid flows in the direction indicated by the arrows in FIG. 2. The duct 52 and the duct 51 serve respectively as the fluid feed and as the fluid discharge, and the direction of drive of the motors causes the connection 20A of the motor 20 and the connection 11B of the motor 11 serve to feed fluid to them. Thus, in the bypass link LB, the fluid flows in the direction going towards the connection 20A. All of the fluid flowing in said link then goes via the pressure reducer 70. Therefore, during hydrostatic braking in forward travel, said reducer performs its function and can restrict the fluid flow in the bypass link so as to generate a pressure difference at the terminals of the bypassed motors, and so as to enable them to generate retaining torque.

Conversely, while the vehicle is traveling in reverse, it is the duct 51 that serves as the fluid feed, while the duct 52 serves as the discharge. Therefore, the fluid flows in the direction opposite to the direction indicated by the arrows in FIG. 2. In this situation, the bypass link LB is not constricted because, independently of the position of the reducer 70, the fluid goes via the valve 74. This makes it possible to travel in reverse while the link selector is in its second position, and thus with a fluid flow rate that is higher, in which situation it is sufficient for the hydrostatic braking to take place via the only elementary motor 12 that is active.

Figure 3:
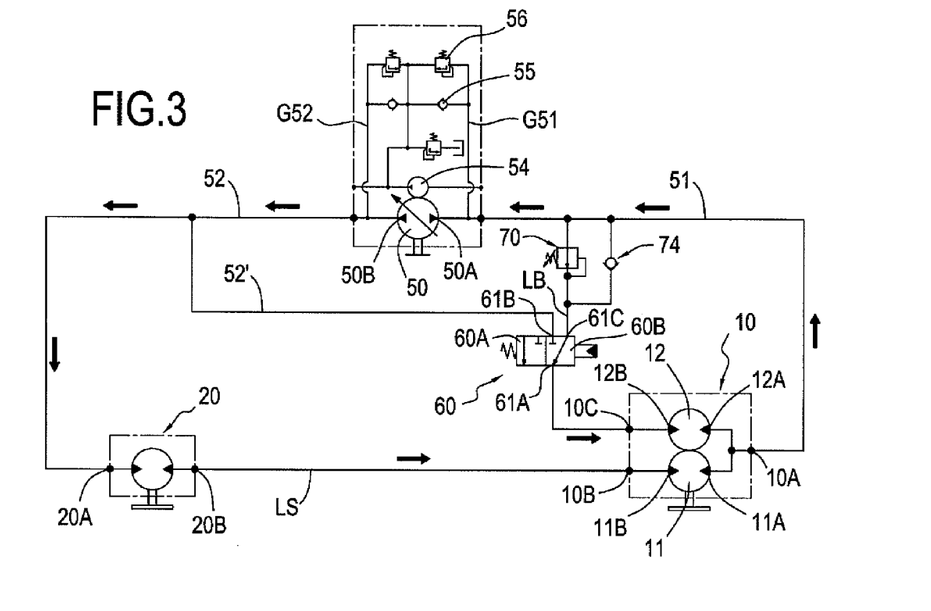
FIGS. 3, 4, 5, and 6 show variants for the circuit of FIG. 2, with the link selector in its second position.

The circuit of FIG. 3 is analogous to the circuit of FIGS. 1 and 2, except that the link selector 60 is disposed differently. It can be seen that the connection 20A of the motor 20 is connected continuously to the main duct 52. Conversely, in the FIG. 3 circuit, the link selector 60 is connected to the second elementary connection 12B of the elementary motor 12, i.e. to the third main connection 10C of the motor 10.

More precisely, in FIG. 3, the first port 61A of the selector 60 is connected to the connection 12B, while, as in FIGS. 1 and 2, its second and third ports 61B and 61C are respectively connected to the main duct 52 (via the duct 52') and to the bypass link LB.

The selector 60 is shown in its second position 60B, in which it connects said second elementary connection 12B to the first main duct 51, via the bypass link LB. Insofar as, as in FIG. 1 and in FIG. 2, the first connection 10A of the motor 10 is connected to the duct 51, the second elementary motor 12 of the motor 10 is bypassed when the link selector 60 is in its second position 60B. Conversely, when it is in its first position 60A, the elementary connection 12B of the motor 12 is connected to the main duct 52 via the link duct 52'.

As in FIGS. 1 and 2, the apparatus comprises a bypass selector formed by a pressure reducer 70 that, in this example, is disposed on the bypass link LB. In addition, a check valve 74 is also disposed in parallel with the reducer 70, so as to allow fluid to flow in the direction going towards the orifice 50A of the pump 50.

In the situation shown in FIG. 3, when the link selector 60 is in its second position, only the second elementary motor 12 of the first motor 10 is deactivated. The pressure reducer 70 makes it possible, by forming a constriction in the bypass link LB, and when necessary, to cause the elementary motor 12 to participate in the hydrostatic braking torque, even though said motor is inactivated.

The arrows of FIG. 3 indicate the direction of flow of the fluid in the ducts for forward travel (while the duct 51 is the duct that serves as the fluid discharge) and while the selector 60 is in its second position 60B. During braking, the pressure reducer 70 and the check valve 74 operate identically to the way in which the same elements in FIG. 2 operate.

Figure 4:
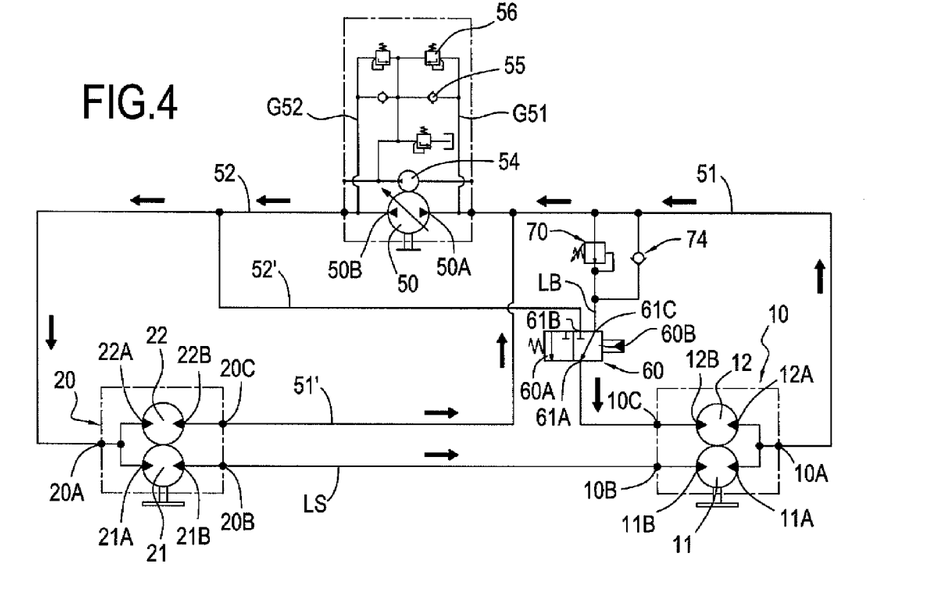

A description follows of the variant shown in FIG. 4, this variant differing from the FIG. 3 variant by the fact that the second hydraulic motor 20 is a dual motor. It comprises first and second elementary motors, respectively 21 and 22. Each of said two elementary motors has a first elementary connection, respectively 21A and 22A, and a second elementary connection, respectively 21B and 22B. In this example, the motor 20 is a motor having three orifices, the first elementary connections 21A and 22A being united to form a common first main connection 20A, while the second elementary connections 21B and 22B are separate, and respectively form second and third main connections, respectively 20B and 20C.

It can be seen that the first elementary connections 21A and 22A of the elementary motors 21 and 22 (the first connection 20A of the motor 20) are connected continuously to the second main duct 52, while, as in FIG. 3, the elementary connections 11A and 12A of the elementary motors 11 and 12 of the motor 10 are connected to the main duct 51. The second elementary connections 11B and 21B of the elementary motors 11 and 21 are interconnected via the series link LS, and the second elementary connection 22B of the elementary motor 22 is connected to the main duct 51.

As in FIG. 3, the link selector 60 is disposed on the duct 52' that connects the second elementary connection 12B of the elementary motor 12 to the duct 52 by having its ports 61A, 61B, and 61C respectively connected to the elementary connection 12B, to the duct 52 and to the bypass link LB. Thus, when said selector is in the first position 60A, in which its ports 61A and 61B communicate with each other, the second elementary connection 12B of the motor 12 is connected to the second main duct 52. Therefore, in this situation, the connections 10A and 20A are respectively connected to the ducts 51 and 52, the connections 10B and 20B are interconnected via the series link LS, the connection 10C is connected to the second main duct 52, and the connection 20C is connected to the first main duct 51.

Thus, the following are established:
  a direct loop including the second elementary motor 12 of the motor 10 that is connected to the ducts 52 and 51;
  a second direct loop including the second elementary motor 22 of the motor 20 that is connected to the ducts 52 and 51; and
  a series loop that includes the elementary motors 21 and 11, disposed in series.

When the link selector 60 is in its second position 60B as shown in FIG. 4, the first direct loop is bypassed because the second elementary connection 12B of the second elementary motor 12 of the motor 10 is connected to the same main duct (51) as its first elementary connection 12A. It would be possible, in addition, to choose to bypass the second direct loop by disposing the bypass selector on the duct 51' that connects the second elementary connection 22B of the elementary motor 22 to the duct 51 (i.e. by respectively connecting its ports 61A, 61B, and 61C to the elementary connection 223, to the duct 51, and to the bypass link LB). In its first position, such a selector would make it possible to link the connection 22B to the duct 51, while, in its second position, it would connect said connection 22B to the duct 52, which would thereby make it possible to increase the braking capacity in reverse as well.

Thus, when the selector 60 is in the second position, the second elementary motor of one of the first and second hydraulic motors 10 and 20 is bypassed via the link that links said two elementary connections to the same main duct, while the second elementary motor of the other motor 10 or 20 is active since its second elementary connection is connected to the same main duct as the main duct to which the two elementary connections of the bypassed motor are connected, while its first elementary connection is connected to the other main duct.

In FIG. 4, the direction of flow in which the fluid flows though the ducts when the vehicle is traveling forwards is indicated by arrows, it being considered that the ducts 52 and 51 serve respectively as the feed and as the discharge. In particular, in the bypass link LB of the loop that is bypassed, the fluid flows in the direction going towards the second elementary connection 12B of the motor 12, because of the direction of operation of the motor 10. Thus, in forward travel, all of the fluid flowing through the link LB goes via the pressure reducer 70. Conversely, during braking in reverse, the fluid can flow freely via the opening of the check valve 74.

Figure 5:
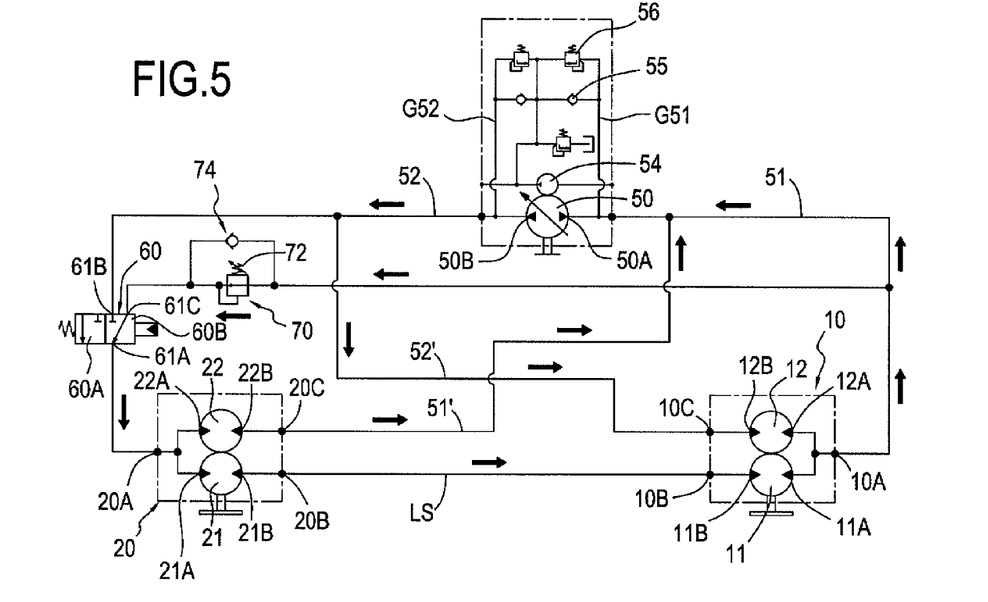

A description follows of FIG. 5 that also shows a variant in which the two motors 10 an 20 are dual motors, but that differs from the FIG. 4 variant by the particular position of the link selector 60 and by the particular position of the bypass selector 70. The first port 61A of the link selector 60 is connected to the connection 20A of the motor 20, and thus to the connections 21A and 22A of the elementary motors 21 and 22, the second port 61B of said link selector is connected to the second main duct 52, and the third port 61C of the selector is connected to the first main duct 51 via the bypass link LB.

In addition, the first elementary connections 11A and 12A of the elementary motors 11 and 12 of the motor 10 are connected continuously to the first main duct 51, as is the second elementary connection 22B of the elementary motor 22 of the motor 20, while the second elementary connections 11B and 21B of the elementary motors 11 and 21 of the motors 10 and 20 are interconnected via the series link LS, and while the second elementary connection 12B of the motor 12 is connected continuously to the duct 52.

Therefore, when the selector 60 is in its first position, the first elementary connections 11A, 12A of the motor 10 and the first elementary connections 21A, 22A of the second motor 20 are respectively connected to the first main duct and to the second main duct, the second elementary connections 11B, 21B of the first elementary motors 11 and 21 are interconnected, and the second elementary connections 12B, 22B of the second elementary motors 12 and 22 of the motors 10 and 20 are respectively connected to the second main duct 52 and to the first main duct 51.

The transmission then operates at full cylinder capacity, with a first direct loop including the elementary motor 12, a second direct loop including the elementary motor 22, and a series loop including the elementary motors 21 and 11 put in series, the motor 21 feeding the motor 11 if it is considered that the ducts 52 and 51 serve respectively for fluid feed and for fluid discharge.

Conversely, when the link selector 60 is in the second position, only the first direct loop including the elementary motor 12 remains active, while the second direct loop and the series loop are bypassed.

When the selector 60 is in its second position 60B as shown, not only are the first elementary connections 11A and 12A of the motor 10 connected to the first main duct, but so are the first elementary connections 21A and 22A of the motor 20. Insofar as the second elementary connections 11B and 21B of the elementary motors 11 and 21 are always interconnected via the series links LS, those two elementary motors are bypassed. In addition, since the second elementary connection 22B of the motor 22 is also connected, via the duct 51', to the main duct 51, said elementary motor 22 is also bypassed. The only motor remaining active is the elementary motor 12 of the motor 10, whose two elementary connections 12A and 12B are respectively connected to the duct 51 and, via the duct 52', to the duct 52.

As indicated above, the third port 61C of the selector 60 is connected to the duct 51 via the bypass link LB. Thus, when the selector 60 is in the second position 60B, the elementary connections 21A and 22A of the elementary motors 21 and 22 are connected via the bypass link.

When the vehicle is traveling forwards, if it is considered that the ducts 52 and 51 serve respectively as the feed and as the discharge, the direction of flow of the fluid is as indicated by the arrows, the direction of flow in the bypass link LB being due to the direction of operation of the motor 20, the elementary motor 22 sucking in the fluid via its elementary connection 22A. The bypass selector formed by the pressure reducer 70 is disposed on the bypass link LB and operates as indicated above. The check valve 74 is disposed in parallel relative to said pressure reducer 70 so as to enable fluid to flow freely only in the direction going towards the orifice 50A of the pump 50. In other words, it makes it possible for fluid to flow freely while the vehicle is traveling in reverse.

In FIGS. 1 to 5, the constriction means formed by the pressure reducer 70 are disposed on the bypass link LB that extends between the elementary connections of at least one bypassed elementary motor. In particular, in FIG. 5, the bypass link LB does indeed extend between the connections 22A and 22B of the elementary motor 22 that is bypassed. In FIG. 5, said segment extends between the elementary connection 21A of the elementary motor 21 that is bypassed and the connection 11A of the elementary motor 11 that is also bypassed. Since these two motors are disposed in series, the bypass link LB does indeed extend between the terminals of the set of the bypassed motors in series.

Figure 6:
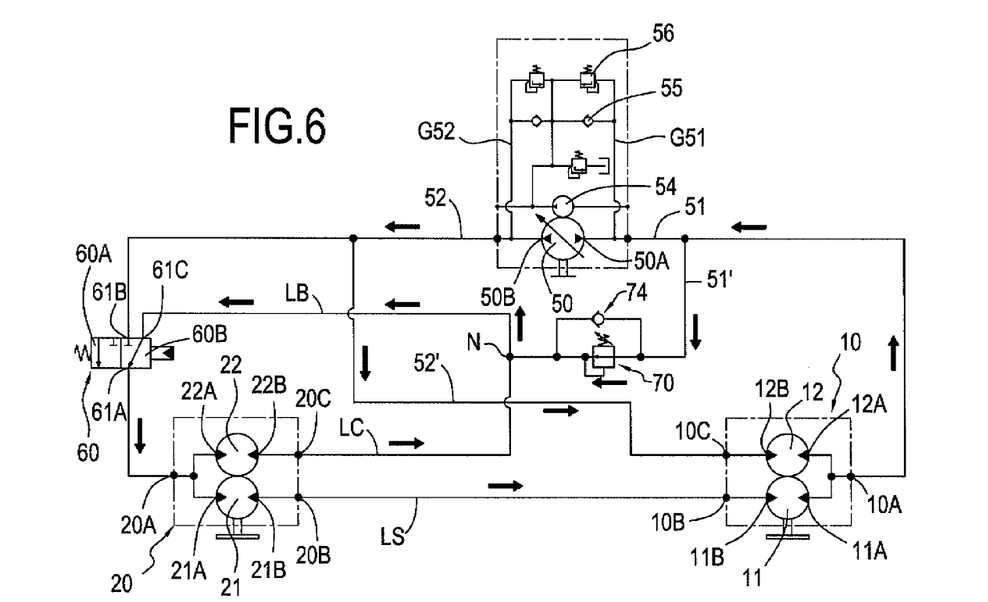

FIG. 6 shows a variant of FIG. 5, also making it possible, when the selector 60 is in the second position, to bypass the motor 20 and the elementary motor 11. In FIG. 6, the elector 60 is disposed in the same way as in FIG. 5. Conversely, in this variant, the pressure reducer 70 is disposed between an orifice of the pump and a link node of the first and second elementary connections of at least one bypassed elementary motor. More precisely, the duct LB, connected to the third port 61C of the selector 60 and the duct LC, connected to the elementary connection 22B of the elementary motor 22 meet at a node N. Said node is connected to the duct 51 via the duct 51', and it is on that link duct 51' that the pressure reducer 70 is disposed.

In other words, the bypass selector 70 is disposed on a connection segment 51' between the bypass loop LB, LC and one of the main ducts, namely the duct 51 in this example.

It can be observed that, as in the preceding figures, a check valve 74 is disposed in parallel relative to the pressure reducer 70. In forward travel, and when the selector 60 is in the second position 60B, the fluid flows in the direction indicated by the arrows, if it is considered that the main ducts 52 and 51 serve respectively as the feed and as the discharge. The direction of flow in the bypass loop LB, LC is due to the direction of drive of the elementary motor 22. The direction of flow in the duct 51' is due to the direction of drive of the motor 20, and in particular of said elementary motor 21.

As in the preceding figures, the pressure reducer makes it possible to constrict the bypass link so as to increase the hydrostatic braking force if necessary. However, due to its particular position, even when it constricts said bypass link, it in no way changes the fact that the fluid is at the same pressure at both of the elementary connections 22A and 22B of the elementary motor 22, because the bypass loop LB, LC forms a closed loop. In other words, said elementary motor 22 does not participate in the hydrostatic braking force. Conversely, due to the constriction that it forms, the pressure reducer establishes a pressure difference between firstly the elementary connection 21A of the elementary motor 21 and secondly the elementary connection 11A of the elementary motor 11. Therefore, said two elementary motors disposed in series can then participate in the hydrostatic braking force.

In the above-described figures, the bypass selector that makes it possible to constrict the bypass link for facilitating hydrostatic braking is implemented in the form of a pressure reducer controlled by the downstream pressure.

Any other type of bypass selector can be imagined, and the control means of said selector can be chosen from among electrical means, mechanical means, and hydraulic means.

Figure 7:
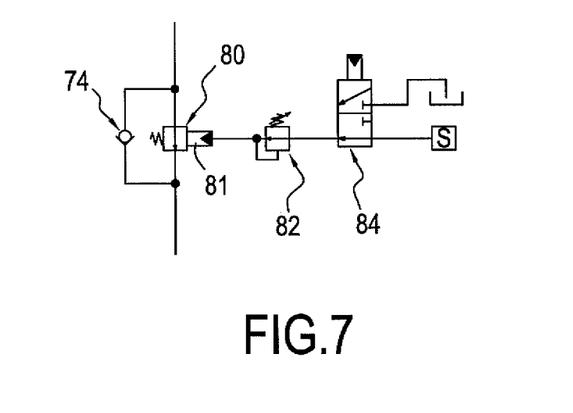
FIGS. 7 and 8 show variants for the bypass selector and its control means.

For example, FIG. 7 shows the use of a hydraulically controlled selector 80 as the bypass selector. The hydraulic control chamber of the hydraulically controlled selector can be fed with fluid by a pressure source S (e.g. from the booster pump 54, see FIG. 1), via a pressure reducer 82 that makes it possible to adjust the pressure in the chamber 81, thereby making it possible to adjust the movement of the moving member of the bypass selector 80 so as to reduce the fluid flow section to various extents. The link that links the inlet of the reducer 82 to the pressure source S can be controlled by a valve 84, e.g. an electrically controlled valve.

Figure 8:
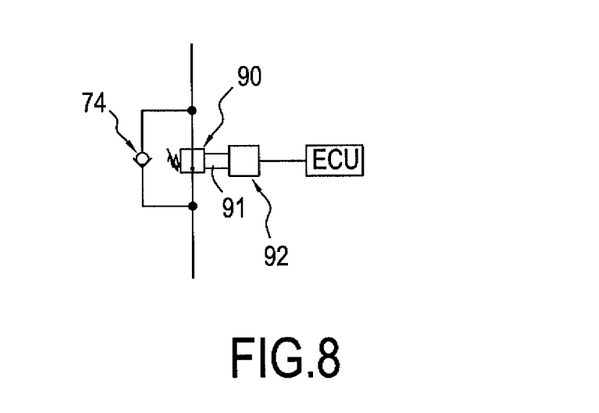

FIG. 8 shows the use, as a bypass selector, of a selector 90 that is controlled as a function of the stroke of a control member 91 that is itself controlled by control means 92. Said control member can, for example, be the joystick via which the driver drives the vehicle, or indeed a braking activation member such as a brake pedal or the like. The command can be relayed by an Electronic Control Unit (ECU). For example, activation of a braking command at a certain level of braking demand can cause the ECU to give a control instruction to the means 92 to move the member 91 in such a manner as to constrict the through flow section of the selector 90 to a greater or to a lesser extent, as a function of the braking demand.

Advantageously, the control means of the bypass selector are suitable for causing the selector to move in such a manner as to servo-control a variable representative of operation of the vehicle to a setpoint. In particular, the variable representative of operation of the vehicle can be the pressure or the flow rate in one of the main ducts, the output torque of one or more motors, their output speeds, the speed of the vehicle, the distance traveled by said vehicle, its position or its distance relative to a target, the acceleration or deceleration of the vehicle, or of the motors, or, for example, an operating parameter of the drive motor of the pump 50 (number of revolutions, speed, torque of said motor, etc.), or a combination of the above-mentioned parameters.

The representative variable can be computed as a function of the control of the various elements in question, by the ECU, but the apparatus advantageously includes means for detecting the value of said variable or the values of the parameters serving to compute it.

The setpoint serving for the servo-control can be stored by suitable means and the above-mentioned ECU can then receive the detected value for the representative value and/or compute it, compare said value with the stored setpoint, and respond to said comparison by issuing a control signal for controlling the bypass selector. The setpoint is chosen such as to make it possible to obtain the additional hydrostatic braking torque during hydrostatic braking under good conditions, while the link selector is in its second position. The means for storing the setpoint can be contained in a memory zone of a microprocessor.

Advantageously, for issuing the control signal for controlling the bypass selector, the apparatus includes a regulation system of the Proportional-Integral-Derivative (PID) type.

The setpoint used for the servo-control is advantageously a variation relationship for the variable representative of operation of the motor.

When the servo-control is implemented on the pressure in the duct that, in the preferred direction of the travel of the vehicle, serves as the discharge, said servo-control can make it possible to prevent the drive motor of the pump 50 from racing, by making provision for said pressure not to exceed a defined value in hydrostatic braking.

The servo-control used for causing the bypass link to be constricted can also be used for accessory functions such as assisting with turning of the vehicle, because the servo-control makes it possible to increase the hydrostatic baking by then braking the wheel on the inside of the turn, or balancing the front/rear braking of the various drive wheels of the vehicle, or indeed braking of the Anti-lock Braking System (ABS) type.

The invention claimed is:

1. Hydrostatic transmission apparatus for a vehicle having at least two drive members disposed one after the other in the direction of travel of said vehicle, the apparatus comprising a main hydraulic pump having two orifices, two main ducts that are respectively a feed main duct and a discharge main duct, first and second hydraulic motors connected to the main pump for the purpose of driving respective ones of said first and second drive members, and a link selector, at least the first hydraulic motor being a dual motor made up of two elementary motors, a series link existing between the first elementary motor of said first hydraulic motor and the second hydraulic motor, the link selector being suitable for taking up a first position in which a series loop including said series link coexists with a direct loop including a direct link linking at least the second elementary motor of the first hydraulic motor to the two respective orifices of the main pump, and a second position in which at least one of said direct and series loops is bypassed by a bypass link, the apparatus further comprising a constriction valve suitable for being activated to restrict the flow of fluid through said bypass link, and a controller for controlling the constriction valve, as a function of the stroke of a control member.

2. Apparatus as claimed in claim 1, wherein the constriction valve comprises a bypass selector suitable for enabling fluid to flow substantially freely in said bypass link when the fluid pressure in said link is less than a pressure threshold in said link, and for restricting the flow of fluid in said link when said pressure is greater than said pressure threshold.

3. Hydrostatic transmission apparatus for a vehicle having at least two drive members disposed one after the other in the direction of travel of said vehicle, the apparatus comprising a main hydraulic pump having two orifices, two main ducts that are respectively a feed main duct and a discharge main duct, first and second hydraulic motors connected to the main pump for the purpose of driving respective ones of said first and second drive members, and a link selector, at least the first hydraulic motor being a dual motor made up of two elementary motors, a series link existing between the first elementary motor of said first hydraulic motor and the second hydraulic motor, the link selector being suitable for taking up a first position in which a series loop including said series link coexists with a direct loop including a direct link linking at least the second elementary motor of the first hydraulic motor to the two respective orifices of the main pump, and a second position in which at least one of said direct and series loops is bypassed by a bypass link, the apparatus further comprising a constriction valve suitable for being activated to restrict the flow of fluid through said bypass link, and a controller for controlling the constriction valve for causing said valve to move in such a manner as to servo-control a variable representative of operation of the vehicle to a setpoint.

4. Apparatus as claimed in claim 3 wherein the constriction valve comprises a bypass selector suitable for enabling fluid to flow substantially freely in said bypass link when the fluid pressure in said link is less than a pressure threshold in said link, and for restricting the flow of fluid in said link when said pressure is greater than said pressure threshold.

5. Apparatus according to claim 4, wherein the controller comprises a memory for storing the setpoint and an electronic control unit suitable for receiving the detected value for the representative value, for comparing said value with the stored setpoint, and for responding to said comparison by issuing a control signal.

6. Apparatus according to claim 3, wherein the controller comprises a memory for storing the setpoint and an electronic control unit suitable for receiving the detected value for the representative value, for comparing said value with the stored setpoint, and for responding to said comparison by issuing a control signal.

7. Apparatus as claimed in claim 3, wherein the constriction valve comprises a bypass selector suitable for enabling fluid to flow substantially freely in said bypass link when the fluid pressure in said link is less than a pressure threshold in said link, and for restricting the flow of fluid in said link when said pressure is greater than said pressure threshold, and wherein the bypass selector is disposed in the bypass link.

8. Apparatus as claimed in claim 3, wherein the constriction valve comprises a bypass selector suitable for enabling fluid to flow substantially freely in said bypass link when the fluid pressure in said link is less than a pressure threshold in said link, and for restricting the flow of fluid in said link when said pressure is greater than said pressure threshold, and wherein the bypass selector is disposed on a connection segment between a bypass loop including the bypass link and one of the main ducts.

9. Apparatus as claimed in claim 3, wherein the constriction valve comprises a bypass selector suitable for enabling fluid to flow substantially freely in said bypass link when the fluid pressure in said link is less than a pressure threshold in said link, and for restricting the flow of fluid in said link when said pressure is greater than said pressure threshold, and further comprising a check valve that is disposed in parallel with the bypass selector so as to allow free flow in the bypass link, in a single direction only.

10. Apparatus as claimed in claim 3, wherein the constriction valve comprises a bypass selector suitable for enabling fluid to flow substantially freely in said bypass link when the fluid pressure in said link is less than a pressure threshold in said link, and for restricting the flow of fluid in said link when said pressure is greater than said pressure threshold, and wherein the bypass selector is a pressure-reducing valve.

11. Hydrostatic transmission apparatus for a vehicle having at least two drive members disposed one after the other in the direction of travel of said vehicle, the apparatus comprising a main hydraulic pump having two orifices, two main ducts that are respectively a feed main duct and a discharge main duct, first and second hydraulic motors connected to the main pump for the purpose of driving respective ones of said first and second drive members, and a link selector, at least the first hydraulic motor being a dual motor made up of two elementary motors, a series link existing between the first elementary motor of said first hydraulic motor and the second hydraulic motor, the link selector being suitable for taking up a first position in which a series loop including said series link coexists with a direct loop including a direct link linking at least the second elementary motor of the first hydraulic motor to the two respective orifices of the main pump, and a second position in which at least one of said direct and series loops is bypassed by a bypass link, the apparatus further comprising a constriction valve suitable for being activated to restrict the flow of fluid through said bypass link, and a controller for controlling the constriction valve, which controller is chosen from among an electrical controller, a mechanical controller, and a hydraulic controller.

12. Apparatus as claimed in claim 11, wherein the controller is a hydraulic controller including a pressure reducer.

13. Apparatus as claimed in claim 11, wherein the constriction valve comprises a bypass selector suitable for enabling fluid to flow substantially freely in said bypass link when the fluid pressure in said link is less than a pressure threshold in said link, and for restricting the flow of fluid in said link when said pressure is greater than said pressure threshold.

14. Apparatus as claimed in claim 13, wherein the bypass selector is disposed in the bypass link.

15. Apparatus as claimed in claim 13, wherein the bypass selector is disposed on a connection segment between a bypass loop including said bypass link and one of the main ducts.

16. Apparatus as claimed in claim 13, further comprising a check valve that is disposed in parallel with the bypass selector so as to allow free flow in the bypass link, in a single flow direction only.

17. Hydrostatic transmission apparatus for a vehicle having at least two drive members disposed one after the other in the direction of travel of said vehicle, the apparatus comprising a main hydraulic pump having two orifices, two main ducts that are respectively a feed main duct and a discharge main duct first and second hydraulic motors connected to the main pump for the purpose of driving respective ones of said first and second drive members, and a link selector, at least the first hydraulic motor being a dual motor made up of two elementary motors, a series link existing between the first elementary motor of said first hydraulic motor and the second hydraulic motor, the link selector being suitable for taking up a first position in which a series loop including said series link coexists with a direct loop including a direct link linking at least the second elementary motor of the first hydraulic motor to the two respective orifices of the main pump, and a second position in which at least one of said direct and series loops is bypassed by a bypass link, the apparatus further comprising a constriction valve suitable for being activated to restrict the flow of fluid through said bypass link, wherein the constriction valve comprises a bypass selector suitable for enabling fluid to flow substantially freely in said bypass link when the fluid pressure in said link is less than a pressure threshold in said link and for restricting the flow of fluid in said link when said pressure is greater than said pressure threshold, and wherein the bypass selector is a progressive selector suitable for progressively restricting the flow of fluid through the bypass link.

18. Apparatus as claimed in claim 17, wherein the bypass selector is disposed in the bypass link.

19. Apparatus as claimed in claim 17, wherein the bypass selector is disposed on a connection segment between a bypass loop including said bypass link and one of the main ducts.

20. Apparatus as claimed in claim 17, further comprising a check valve that is disposed in parallel with the bypass selector so as to allow free flow in the bypass link, in a single flow direction only.

21. Hydrostatic transmission apparatus for a vehicle having at least two drive members disposed one after the other in the direction of travel of said vehicle, the apparatus comprising a main hydraulic pump having two orifices, two main ducts that are respectively a feed main duct and a discharge main duct, first and second hydraulic motors connected to the main pump for the purpose of driving respective ones of said first and second drive members, and a link selector, at least the first hydraulic motor being a dual motor made up of two elementary motors, a series link existing between the first elementary motor of said first hydraulic motor and the second hydraulic motor, the link selector being suitable for taking up a first position in which a series loop including said series link coexists with a direct loop including a direct link linking at least the second elementary motor of the first hydraulic motor to the two respective orifices of the main pump, and a second position in which at least one of said direct and series loops is bypassed by a bypass link, the apparatus further comprising a constriction valve suitable for being activated to restrict the flow of fluid through said bypass link, wherein the second hydraulic motor is also a dual motor that is made up of two elementary motors, each of which has first and second elementary connections, wherein, when the link selector is in the first position, the first elementary connections of the first hydraulic motor and the first elementary connections of the second hydraulic motor are connected to respective ones of a first one of the feed and discharge main ducts and a second one of the feed and discharge main ducts, the second elementary connections of the first elementary motors of said first and second hydraulic motors are interconnected, and the second elementary connections of the second elementary motors of said first and second hydraulic motors are connected to respective ones of the second one of the feed and discharge main ducts and first one of the feed and discharge main ducts, whereas, when the link selector is in the second position, the first elementary connections of the first hydraulic motor and the first elementary connections of the second hydraulic motor are connected to respective ones of the first one of the feed and discharge main ducts and second one of the feed and discharge main ducts, the second elementary connections of the first elementary motors of said first and second hydraulic motors are interconnected, and the second elementary connection of the second elementary motor of one of said first and second hydraulic motors that is a bypassed elementary motor is connected to the same main duct as the first elementary connection of said bypassed elementary motor, while the second elementary connection of the second elementary motor of the other hydraulic motor is connected to said same main duct.

22. Hydrostatic transmission apparatus for a vehicle having at least two drive members disposed one after the other in the direction of travel of said vehicle, the apparatus comprising a main hydraulic pump having two orifices, two main ducts that are respectively a feed main duct and a discharge main duct, first and second hydraulic motors connected to the main pump for the purpose of driving respective ones of said first and second drive members, and a link selector, at least the first hydraulic motor being a dual motor made up of two elementary motors, a series link existing between the first elementary motor of said first hydraulic motor and the second hydraulic motor, the link selector being suitable for taking up a first position in which a series loop including said series link coexists with a direct loop including a direct link linking at least the second elementary motor of the first hydraulic motor to the two respective orifices of the main pump, and a second position in which at least one of said direct and series loops is bypassed by a bypass link, the apparatus further comprising a constriction valve suitable for being activated to restrict the flow of fluid through said bypass link, wherein the second hydraulic motor is also a dual motor that is made up of two elementary motors, each of which has first and second elementary connections, wherein, when the link selector is in the first position, the first elementary connections of the first hydraulic motor and the first elementary connections of the second hydraulic motor are connected to respective ones of a first one of the feed and discharge main ducts and a second one of the feed and discharge main ducts, the second elementary connections of the first elementary motors of said first and second hydraulic motors are interconnected, and the second elementary connections of the second elementary motors of said first and second hydraulic motors are connected to respective ones of the second one of the feed and discharge main ducts and first one of the feed and discharge main ducts, whereas, when the link selector is in the second position, the first elementary connections of the first and second hydraulic motors are connected to the first one of the feed and discharge main ducts, the second elementary connections of the first elementary motors of said first and second hydraulic motors are interconnected, the second elementary connection of the second elementary motor of the first hydraulic motor is connected to the second one of the feed and discharge main ducts and the second elementary connection of the second elementary motor of the second hydraulic motor is connected to the first one of the feed and discharge main ducts, so that the two elementary motors of the second hydraulic motor and the first elementary motor of the first hydraulic motor are bypassed.

23. Apparatus as claimed in claim 22, wherein the constriction valve is disposed between one of the two orifices of the pump and a link node of the first and second elementary connections of at least one bypassed elementary motor.

* * * * *